US010755589B2

(12) United States Patent
Lottridge et al.

(10) Patent No.: US 10,755,589 B2
(45) Date of Patent: *Aug. 25, 2020

(54) SYSTEM AND METHOD FOR SCORING CONSTRUCTED RESPONSES

(71) Applicant: ACT, INC., Iowa City, IA (US)

(72) Inventors: Susan M. Lottridge, Monterey, CA (US); Howard C. Mitzel, Seaside, CA (US); John A. Pennington, Monterey, CA (US)

(73) Assignee: ACT, INC., Iowa City, IA (US)

( * ) Notice: Subject to any disclaimer, the term of this patent is extended or adjusted under 35 U.S.C. 154(b) by 1471 days.

This patent is subject to a terminal disclaimer.

(21) Appl. No.: 14/528,454

(22) Filed: Oct. 30, 2014

(65) Prior Publication Data

US 2015/0050636 A1 Feb. 19, 2015

Related U.S. Application Data

(63) Continuation of application No. 12/137,213, filed on Jun. 11, 2008, now Pat. No. 8,882,512.

(51) Int. Cl.
*G09B 3/02* (2006.01)
*G09B 19/08* (2006.01)

(52) U.S. Cl.
CPC .............. *G09B 3/02* (2013.01); *G09B 19/08* (2013.01)

(58) Field of Classification Search
CPC ............. G09B 7/02; G09B 7/00; G09B 19/08
USPC .......................... 434/322, 323, 351, 352, 353
See application file for complete search history.

(56) References Cited

U.S. PATENT DOCUMENTS

| 5,987,302 | A | 11/1999 | Driscoll et al. | |
|---|---|---|---|---|
| 5,991,595 | A * | 11/1999 | Romano | G09B 7/02 382/321 |
| 6,816,702 | B2 | 11/2004 | Kuntz et al. | |
| 7,434,176 | B1 * | 10/2008 | Froloff | G06F 17/27 715/763 |
| 7,769,339 | B2 | 8/2010 | Burstein et al. | |

(Continued)

OTHER PUBLICATIONS

Foltz, P. W., et al., "Automated Essay Scoring: Applications to Educational Technology," Proceedings of the World Conference on Educational Multimedia, Hypermedia and Telecommunications, 1999, pp. 939-944 (6 pages).

(Continued)

*Primary Examiner* — Xuan M Thai
*Assistant Examiner* — Sadaruz Zaman
(74) *Attorney, Agent, or Firm* — Sheppard, Mullin, Richter & Hampton LLP

(57) ABSTRACT

A computerized system for scoring constructed responses to one or more prompts. The system receives a plurality of constructed responses in an electronic font-based format and separates the plurality of constructed responses into a first group of constructed responses that are scorable by the system and a second group of constructed responses that are not scorable by the system. The constructed responses in the first group are assigned scores based on predetermined rules, and the scores are sent to a score database. In a preferred embodiment, the first group includes constructed responses that do not answer the prompt and constructed responses that match pre-scored responses. The second group of constructed responses are sent by the system to a hand-scorer for manual scoring.

20 Claims, 12 Drawing Sheets

(56) References Cited

U.S. PATENT DOCUMENTS

| | | |
|---|---|---|
| 7,831,196 B2 | 11/2010 | Attali et al. |
| 2002/0001795 A1 | 1/2002 | Bejar et al. |
| 2004/0175687 A1* | 9/2004 | Burstein .................. G06F 17/27 434/353 |
| 2005/0026131 A1* | 2/2005 | Elzinga .................... G09B 7/00 434/365 |
| 2005/0042592 A1 | 2/2005 | Burstein et al. |
| 2005/0080614 A1* | 4/2005 | Bennett .................. G06F 17/27 704/9 |
| 2006/0172276 A1* | 8/2006 | Higgins ................... G09B 7/00 434/362 |
| 2012/0088219 A1* | 4/2012 | Briscoe ................ G06N 99/005 434/362 |

OTHER PUBLICATIONS

Prince George's County Public Schools, "Welcome to the Electronic Learning Community," Mar. 2009, 3 pages, Retrieved on Oct. 13, 2011, Retrieved from http://www.pcps.org.com.

\* cited by examiner

SYSTEM AND METHOD FOR SCORING CONSTRUCTED RESPONSES

CROSS-REFERENCE TO RELATED APPLICATIONS

This application is continuation of U.S. patent application Ser. No. 12/137,213, filed on Jun. 11, 2008, which issued as U.S. Pat. No. 8,882,512 on Nov. 11, 2014, and is incorporated by reference herein in its entirety.

COPYRIGHT NOTIFICATION

Portions of this patent application contain material that is subject to copyright protection. The copyright owner has no objection to the facsimile reproduction by anyone of the patent document, or the patent disclosure, as it appears in the U.S. Patent and Trademark Office, but otherwise reserves all copyrights in the material.

BACKGROUND OF THE INVENTION

I. Field of the Invention

The present invention relates generally to systems and methods for scoring constructed responses generated by one or more students in response to one or more prompts and, more particularly, to systems and methods that reduce the amount of hand-scoring needed to score short-answer constructed responses.

II. Discussion of the Background Art

Schools in the United States and other parts of the world have been administering standardized tests for many years. In practice, standardized tests often include some combination of multiple choice questions and questions requiring a written response, such as an essay or a constructed response. The term "constructed response," as used herein, refers to a short text string containing a limited amount of highly specific impersonal information. The number of distinct correct responses is very limited, but there are many ways to construct a correct response. An essay differs from a constructed response in that it is a literary composition on a particular theme or subject, in prose and generally analytic, speculative, or interpretative in nature and typically consists of and is influenced by a student's own personal thoughts, feelings, ideas, preferences, and knowledge, and seeks to be one of an infinite number of highly variable "correct" responses.

Multiple choice questions are a convenient way to assess achievement or ability in part because an answer is chosen from a finite set of pre-constructed responses and the answer can be scored quickly and accurately using automated techniques. However, because students are presented with pre-constructed responses, it is possible for a student to guess the right answer without having a requisite level of achievement or ability. Constructed responses require the student to answer by constructing a response; and, therefore, the correct answer cannot be guessed from a set of options. Constructed responses are usually graded by hand because of the difficulty in accounting for all the various ways in which a response may be constructed.

Hand scoring constructed responses is time-consuming and expensive. Graders use rubrics (rules or guidelines) and anchor papers (examples of papers for each possible score) to determine the grade to be given to a response. The process can take several minutes for each response. In addition, it is well known that agreement between scorers can vary depending on the test item, rubric, and the scoring session. For this reason, some states pay to have two or more scorers read each paper to improve reliability, though this does not eliminate the possibility of assigning an incorrect score. Automated grading systems have been proposed to reduce the time and expense associated with scoring constructed responses, and to ensure scoring consistency. To date, only systems that score writing essays (as compared to short-answer constructed response items) have provided an acceptable degree of accuracy in comparison with hand scoring.

SUMMARY OF THE INVENTION

The primary object of the present invention is to overcome the deficiencies of the prior art described above by providing a system, method, and computer program product that reduces the number of constructed responses that are hand-scored, thereby lowering the overall cost of scoring.

In accordance with a first aspect of the present invention, a system for scoring constructed responses includes a computer with a processor and a memory device storing a set of digital instructions executable by said processor to perform the steps of: receiving a plurality of constructed responses in an electronic font-based format; separating the plurality of constructed responses into a first group of constructed responses that are scorable by the system and a second group of constructed responses that are not scorable by the system; assigning scores to each of the constructed responses in the first group of constructed responses; sending the scores to a score database; and submitting the second group of constructed responses to a hand-scoring entity for manual scoring.

In accordance with a second aspect of the present invention, a method of scoring constructed responses includes the steps of receiving a plurality of constructed responses in an electronic font-based format; separating the plurality of constructed responses into a first group of constructed responses that are scorable by the system and a second group of constructed responses that are not scorable by the system; assigning scores to each of the constructed responses in the first group of constructed responses; sending the scores to a score database; and submitting the second group of constructed responses to a hand-scoring entity for manual scoring.

In accordance with a third aspect of the present invention, a computerized system for scoring constructed responses includes means for receiving a plurality of constructed responses in an electronic font-based format; means for separating the plurality of constructed responses into a first group of constructed responses that are scorable by the system and a second group of constructed responses that are not scorable by the system; means for assigning scores to each of the constructed responses in the first group of constructed responses; means for sending the scores to a score database; and means for submitting the second group of constructed responses to a hand-scoring entity for manual scoring.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION OF THE PREFERRED EMBODIMENT

Figure 1:
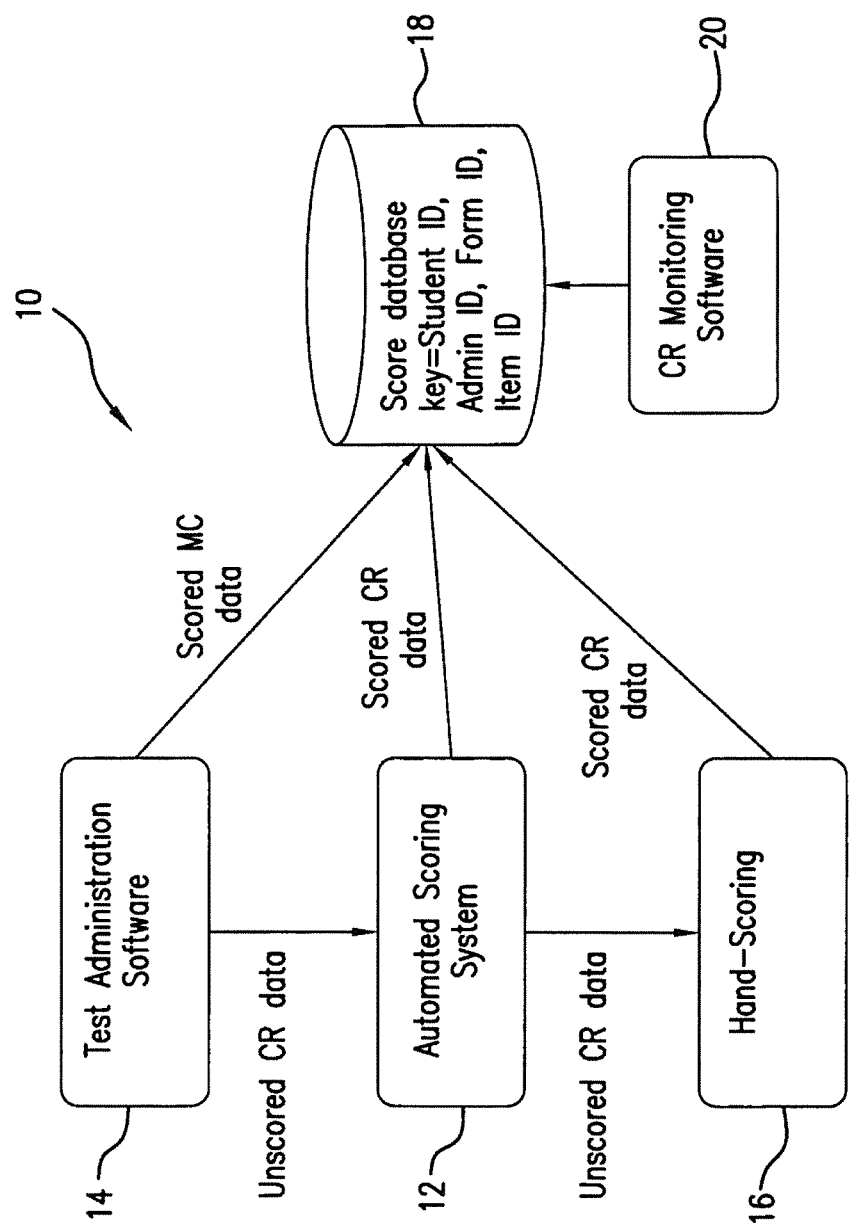
FIG. 1 is a schematic diagram illustrating data flow in a test scoring environment configured to include an automated scoring system according to the present invention.

FIG. 1 is a schematic diagram illustrating data flow in a test scoring environment 10 configured to include an automated scoring system 12 according to the present invention. Referring still to FIG. 1, it can be seen that the automated scoring system 12 is interposed between test administration and hand-scoring systems 14 and 16 as an intermediate step in the scoring of constructed responses. The test administration system 14 collects multiple choice and constructed response data from students. Multiple choice items are scored by the test administration system 14, and the scored multiple choice data is sent directly to a score database 18. The collection of student responses and the scoring of multiple choice items can be accomplished using systems and methods that are well known to those of skill in the art.

In accordance with the present invention, unscored constructed response data is routed from the test administration system 14 to the automated scoring system 12, instead of being routed directly to the hand-scoring system or vendor 14. In a preferred embodiment, the unscored constructed response data is provided to the automated scoring system 12 in a digital, font-based format (e.g., as a text file as opposed to an image or graphics file). As will be explained in greater detail below, an attempt is made to score the constructed responses using the automated scoring system 12. Scored constructed response data is sent by the automated scoring system 12 to the score database 18, and unscored constructed response data is sent to the hand-scoring system 16 for hand-scoring. Also shown in FIG. 1 is optional constructed response monitoring software 20, which will be described in greater detail below.

Figure 2:
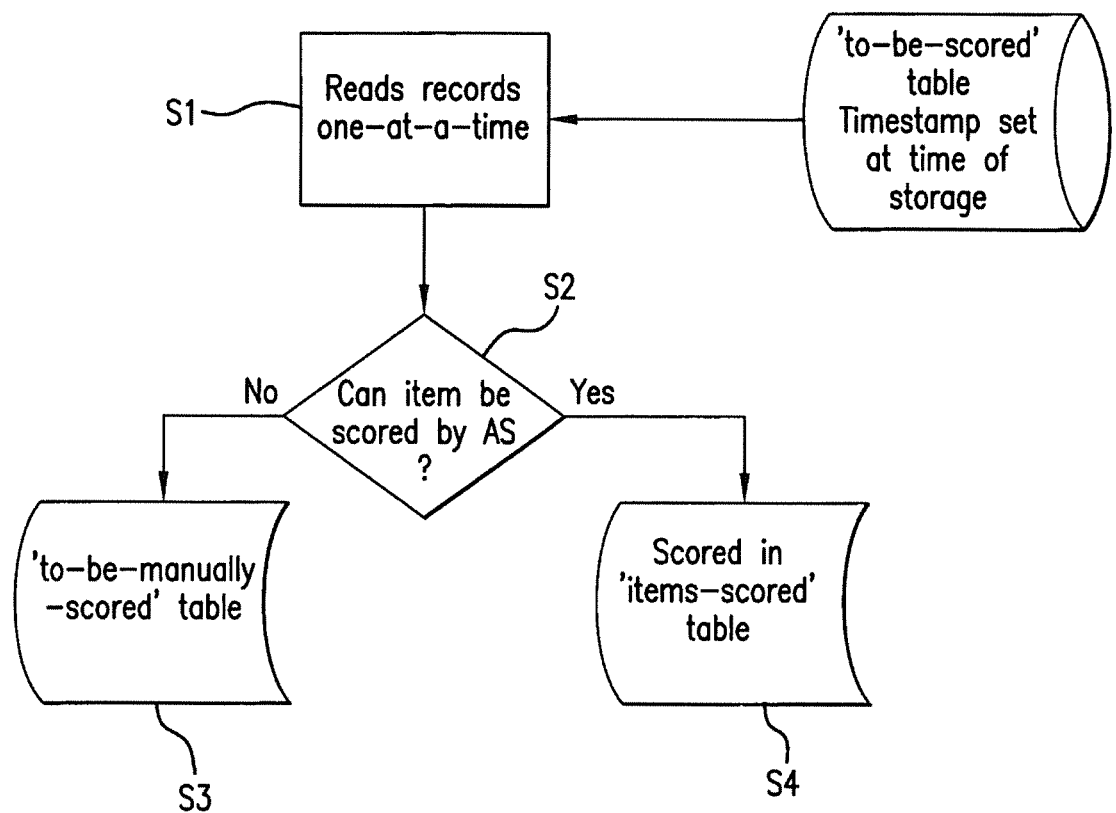
FIG. 2 is a flow diagram further illustrating the process and/or data flow in a test scoring environment including an automated scoring system according to the present invention.

Operation of the automated scoring system 12 is illustrated in the flow chart shown in FIG. 2. In step s1, the system reads constructed response records or data from a table of unscored constructed responses (e.g., a 'to_be_scored' table with a timestamp set at the time of storage) stored by the test administration system. The records are preferably read one at a time in serial fashion by the system in step s1. Alternatively, the system can be configured to read multiple records in parallel. At step s2, the system determines whether or not the constructed response item was scored by the automated scoring software. If the system determines that the constructed response item was not scored by the automated scoring software, then the item is submitted for hand-scoring, for example by adding the item to a table of unscored constructed responses (e.g., a 'to_be_manually_scored' table) as shown at step s3. If the system determines that the item was scored by the automated scoring software, then the score data is submitted to the score database (e.g., in a 'items_scored' table) as shown in step s4.

The automated scoring system is preferably implemented using a computer with a processor and a digital storage device (e.g., a hard drive or the like) storing a set of machine readable instructions (i.e., automated scoring software) that is executable by the processor to cause the system to process student responses in accordance with the present invention. In general, the system will receive student responses in a digital font-based format, will attempt to score the responses, and will separate the responses into a first group of responses that could be scored by the system and a second group of responses that could not be scored by the system and must therefore be submitted for hand-scoring.

The software used by the system to process the student responses includes at least one, and preferably both, of a first subset of instructions (i.e., a first software module) referred to as a list-based processor and a second subset of instructions (i.e., a second software module) referred to as a parser. The parser captures non-scorable responses, or responses that are not meaningful and would otherwise receive the lowest score (e.g., a score of '0' points). In a preferred embodiment, the parser sets a code to evaluate the non-meaningful text, and this code can be then be used to score the response. For example, in a preferred embodiment, the parser pre-processes a student response (e.g., removing extra white space, capitalizing characters), and then examines the response to determine whether it is blank, too short, non-English (e.g., gibberish), off-topic, a refusal (e.g., "This is stupid", "I don't know"), or a copy of the prompt or item instructions. If the parser identifies the response as non-scorable, it sets a code that indicates the type of non-scorable response (e.g., BL for blank), assigns the response a score of 0, and sets a flag that indicates that the response was scored by the parser. The parser can score multi-part items, and scores each part individually. The user can choose to use any of the parser features and can use the features in any order. The user sets thresholds to determine when a response is non-English, too short, off-topic, or a copy of the item or prompt. The user can add to an existing list of refusal phrases, and a list of the code combinations for the Parser to score as 0.

The list-based processor compares an unscored student response to a list of already-scored student responses. For this reason, the list-based processor is particularly useful in evaluating short-answer constructed responses as opposed to essays. In a preferred embodiment, the program pre-processes responses according to parameters set by the user (e.g., removing extra white space or all white space, changing case, removing characters). The processed response is then submitted to a replacement engine that searches the response for phrases that are replaced with more common phrases or are removed. Once the response has been pre-processed and terms have been replaced, the response is then compared to a similarly-processed scored response. If an exact match is found, then the list-based processor assigns the response the score of the matched scored response. The user supplies the list of replacement terms, the list of scored responses, and the pre-processing parameters.

Figure 3:
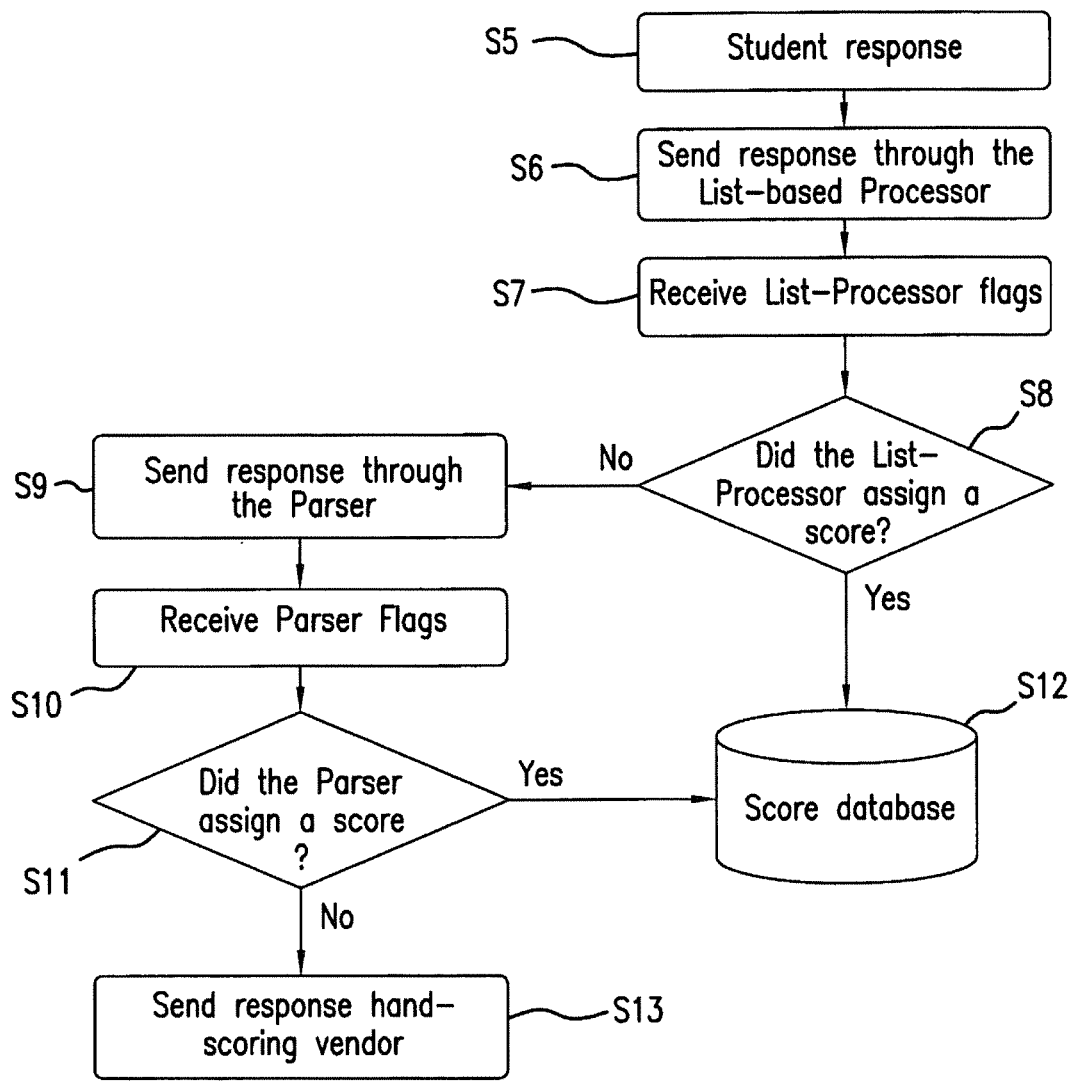
FIG. 3 is a flow diagram illustrating the process and/or data flow through an embodiment of an automated scoring system according to the present invention.

The parser and the list-based processor can be executed in any order. In addition, the user can opt to use one or both of the submodules. FIG. 3 is a flow chart illustrating an embodiment of the present invention wherein the system first sends the unscored constructed response to the list-based processor, and then, only if the list based processor is unable to assign a score, to the parser. More specifically, in step s5, the automated scoring system receives a constructed response from the test administration system. The automated scoring system submits the constructed response to the list-based processor in step s6. The list-based processor compares the response against pre-scored responses and generates a code indicative of whether the response was scored as well as a score, if a match is found. In step s7, the system receives the code and the score (if any) from the list-based processor. At step s8, the system determines whether or not the response was scored by the list-based processor. If the system determines that the list-based processor was unable to score the response, the response is sent to the parser in step s9. The parser checks the response for non-scorable answers and assigns appropriate flags and codes, which are received by the system in step s10. In step s11, the system determines whether a score was assigned by the parser. If the system determines that a score was assigned, the score is saved with any codes and flags at step s12. Otherwise, the response is sent to the hand-scoring system at step s13.

Figure 4:
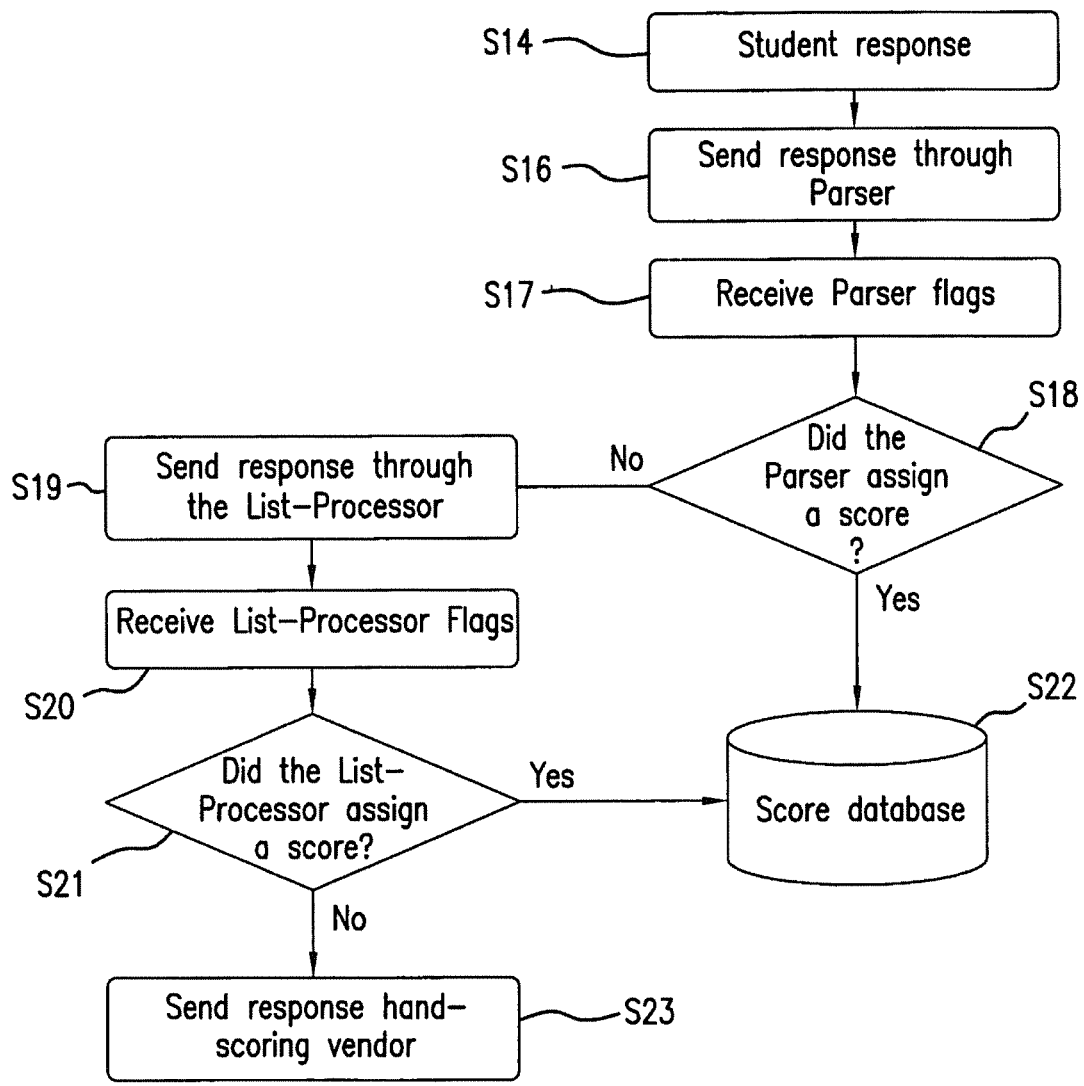
FIG. 4 is a flow diagram illustrating the process and/or data flow through another embodiment of an automated scoring system according to the present invention.

FIG. 4 is a flow chart illustrating another embodiment of the present invention wherein the system first sends the unscored constructed response to the parser, and then, only if the parser is unable to assign a score, to the list-based processor. More specifically, in step s14, the automated scoring system receives a constructed response from the test administration system. The response is sent through the parser at step s16 and parser flags are received at step s17. At step s18, the system determines whether or not the response was scored by the parser. If the system determines that the parser was unable to score the response, the response is sent to list-based processor in step s19. The list-based processor compares the response against pre-scored responses and assigns appropriate flags and codes, which are received by the system in step s20. In step s21, the system determines whether a score was assigned by the list-based processor. If the system determines that a score was assigned, the score is saved with any codes and flags at step s22. Otherwise, the response is sent to the hand-scoring system at step s23.

Figure 5:
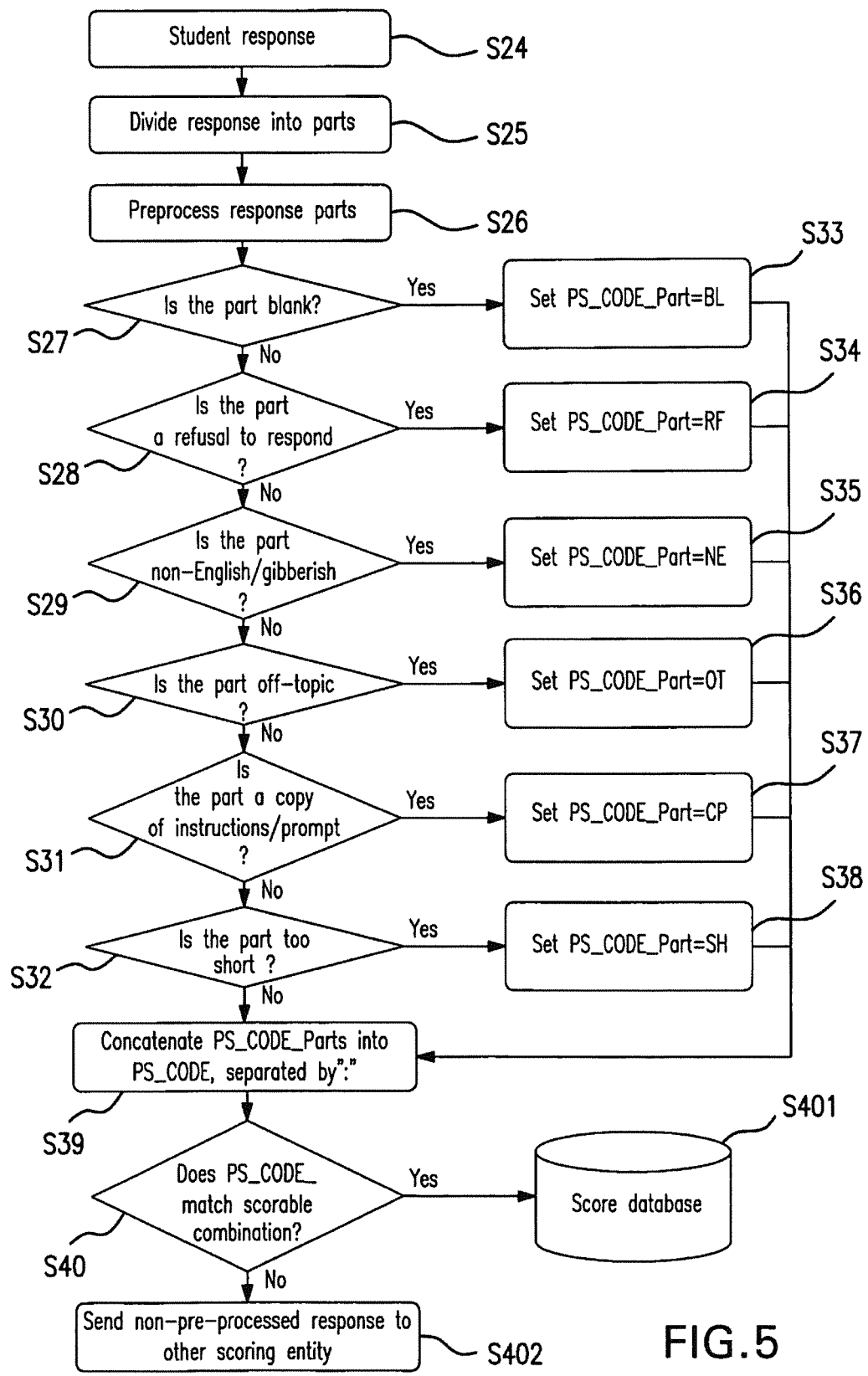
FIG. 5 is a flow diagram illustrating the process and/or data flow through an embodiment of a parser module in an automated scoring system according to the present invention.

FIG. 5 is a flow chart illustrating an embodiment of a method used by the parser to identify non-responsive or meaningless constructed responses in accordance with the present invention. The parser can be customized to implement the features in any order, and to use any combination of features. FIG. 5 presents the option in which all Parser features are used and are used in the order of: blanks, refusal, non-English, off-topic, copy, and too short. In step s24, the parser receives a student response from the test administration system (or from the list-processor, depending upon the automated scoring configuration). The parser determines whether the constructed response item calls for a multi-part response and, if so, the parser divides the response into parts at step s25. The response parts are preprocessed at step s26 and assessed individually by the parser in steps s27-s32 for various indicators of non-responsiveness. If a parser feature assigns a code to a response part, then the later features are not investigated. If none of the parser features assigns a code to a response part, then the parser assigns an "NULL" code to that part (e.g., PS_Code_Part= . . . ). Specifically, at step s27, the parser determines whether or not the response part is blank. If the parser determines that the part is blank, it sets a code at step s33 (e.g., by setting PS_CODE_Part=BL). The parser then determines at step s28 whether the part is a refusal to respond. If so, the parser sets a code at step s34 (e.g., PS CODE Part=RF). The parser then determines at step s29 whether the part is non-English or gibberish. If so, the parser sets a code at step s35 (e.g., PS_CODE_Part=NE). The parser then determines at step s30 whether the part is off-topic. If so, the parser sets a code at step s36 (e.g., PS_CODE_Part=OT). The parser then determines at step s31 whether the part is a copy of the instructions or prompt. If so, the parser sets a code at step s37 (e.g., PS_CODE_Part=CP). The parser then determines at step s32 whether the part is too short. If so, the parser sets a code at step s38 (e.g., PS_CODE_Part=SH). It will be appreciated that the foregoing assessments can be performed by the parser in any order.

At step s39, the parser creates a parser code (e.g., PS_CODE) from the feature codes set in the foregoing steps. The PS_CODE is a concatenation of the feature codes (e.g., PS_CODE_Part). For instance, the PS_Code may have the form BL:RF if the first part of a response is blank, and the second part is a refusal. If the Parser did not assign a feature code to an part response, and thus the response part is assigned a value of " . . . ". This value indicates that the response part was not identified as non-scorable by the parser. A determination is then made at step s40 whether the parser code matches a scorable code combination. For example, a scorable code combination might be that the PS_CODE has a non-Null feature code for each item part. Thus, a code of "BL:RF" is a scorable code combination, but a code of " . . . :BL" is not. If the parser determines that the parser code matches a code combination, the parser saves to the database a flag to indicate that the response has been scored by the parser, and the score as shown in step s401. If the parser determines that the parser code does not match a code combination, the original non-preprocessed response is sent to another scorer such as the list-processor or hand-scorer in step s402.

Figure 6A:
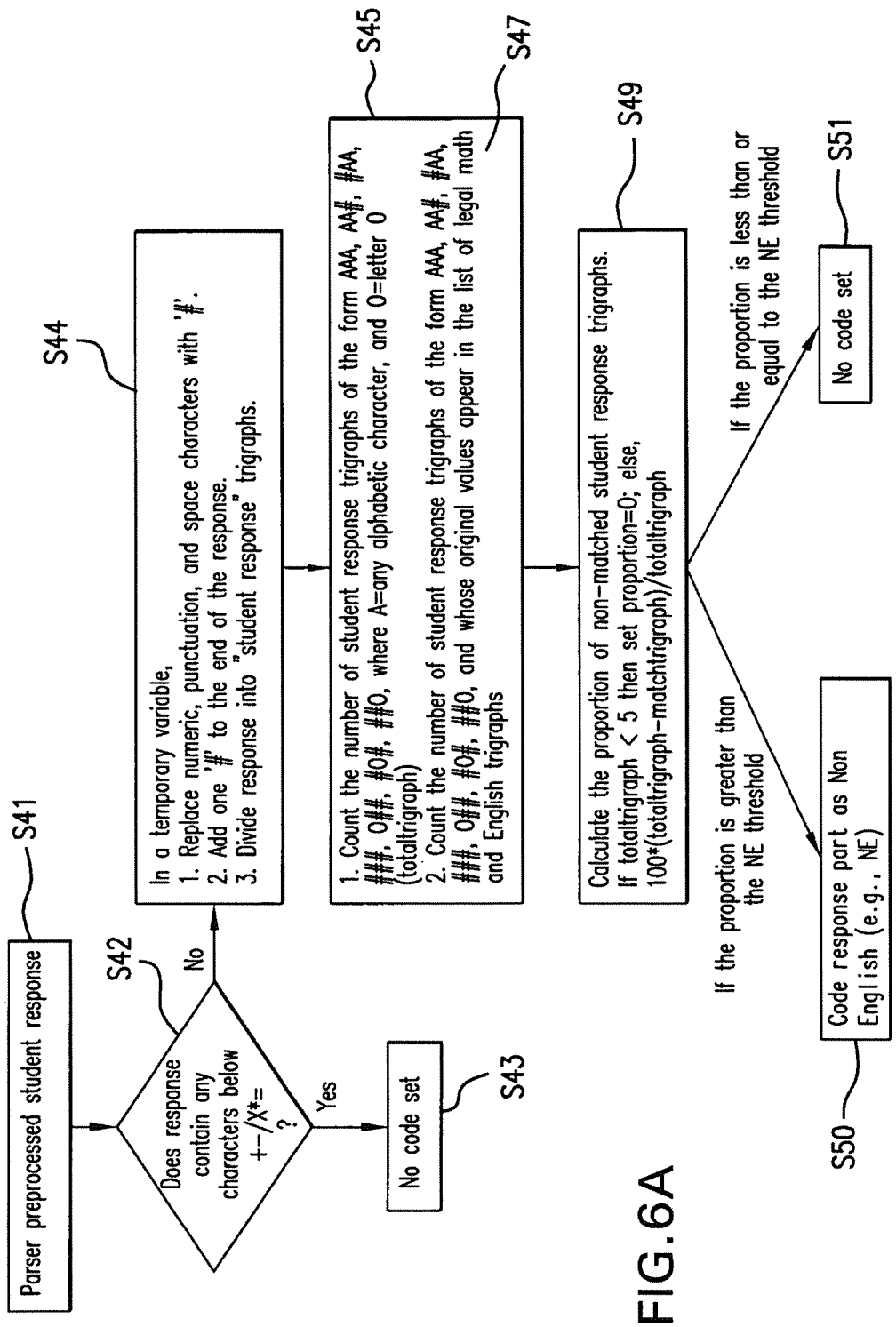
FIG. 6A is a flow diagram illustrating the process and/or data flow through a parser submodule designed to identify non-English responses to mathematics items according to an embodiment of the present invention.
Figure 6B:
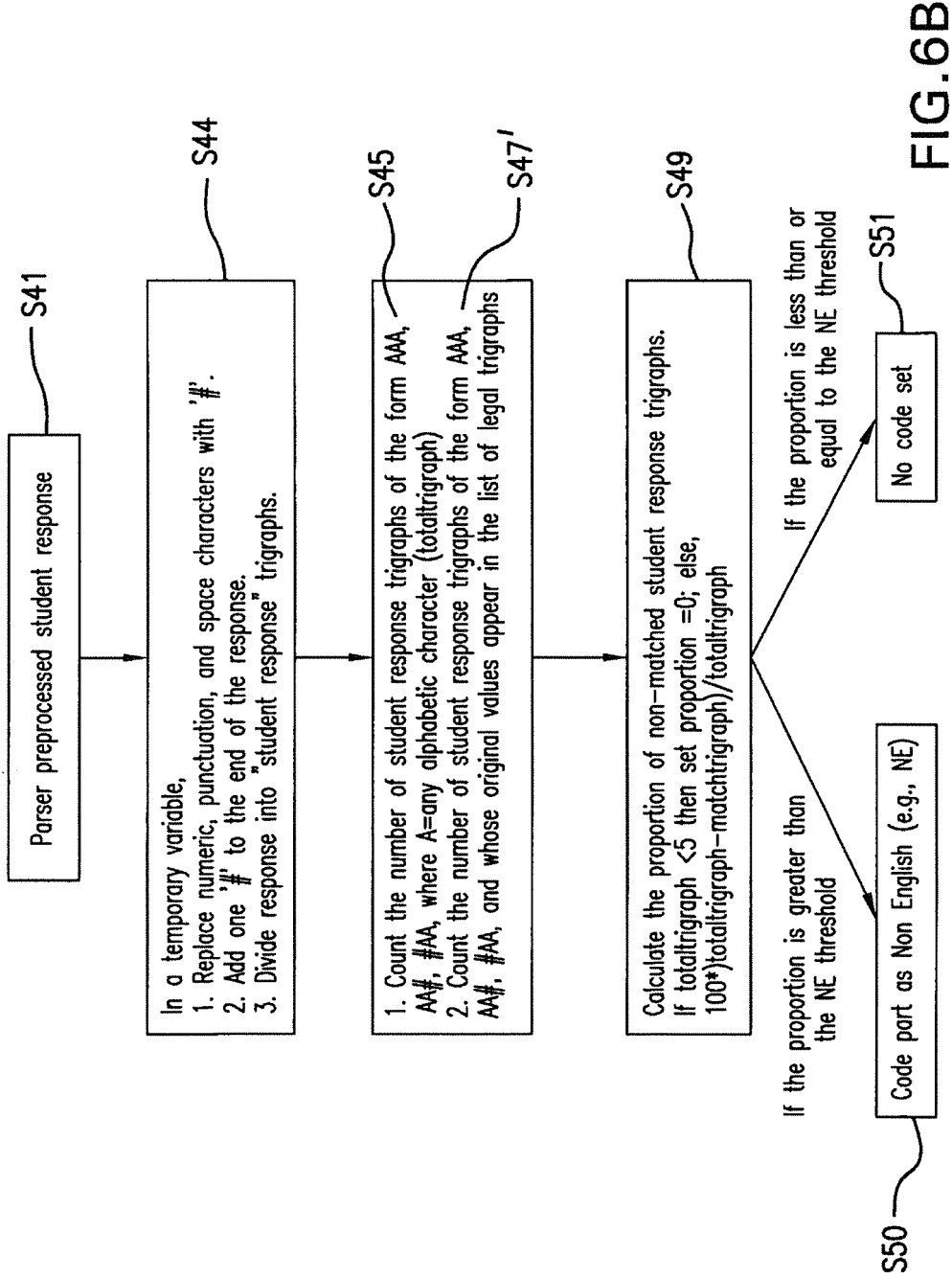
FIG. 6B is a flow diagram illustrating the process and/or data flow through a parser submodule designed to identify non-English responses to non-mathematics items according to an embodiment of the present invention.

FIGS. 6A and 6B are flow charts illustrating details of the method used by the parser to identify non-english constructed responses in accordance with the present invention. FIG. 6A represents a version of the feature to be used with items requiring mathematical symbols in the response. In step s41, the parser receives a preprocessed student response. The parser then determines, at step s42, whether or not the response contains arithmetic symbols or characters, such as the '+', '−', '/', '×', "*", or '=' symbols. If the parser determines that the response contains one or more arithmetic symbols, the no code is set and the non-english feature process is terminated, as shown in step s43. If, on the other hand, the parser determines that the response does not contain arithmetic symbols, then, in step s44, it replaces numeric, punctuation and space characters with a predetermined character, such as adds another predetermined character to the end of the response, and divides the response into trigraphs (three letter combinations).

At step s45, the parser determines whether or not each student response trigraph is of the form AAA, AA #, # AA, ###, O ##, # O #, or ## O, where A is any alphabetic character and 'O' is the letter 'O'. If the parser determines that the student response trigraph is one of these forms, then it considers this trigraph to be a valid one for consideration. For example, a "# HE" trigraph is valid, while a "S ##" is not valid. At this point, the non-english feature increments the number of total trigraphs (totaltrigraph variable). It also checks against a list of common English and math trigraphs in step 47 (e.g., see the first row of Table I, indicated by a 1 in the left-most column), and increments the number of matched trigraphs (matchtrigraph variable) if the trigraph is found in this list. If the trigraph is not "valid" then no change to the totaltrigraph or matchtrigraph variables are made. In step s49, the parser calculates the proportion of non-matched student response trigraphs. If the first counter is less than five, the parser sets the proportion to zero in step s49 because the number of trigraphs is too small to make a determination of non-English. Otherwise, the parser sets the proportion equal to the actual proportion (i.e., 100*(totaltrigraph-matchtrigraph)/totaltrigraph) in step s49. If the proportion is greater than a predetermined threshold (e.g., the NE threshold), the parser codes the part as being a non-English response in step s50. If the proportion is less than or equal to the predetermined threshold, the parser does not assign a code, as shown in step s51.

TABLE I

| Legaltrigraphs.txt list (example) |
| --- |
| 1~### OOO #OO #O# O## ##O #TH THE HE# #AN ND# #OF OF# AND #TO #IN TO# |
| 0~#TH THE HE# #AN ND# #OF OF# AND #TO #IN TO# ED# ER# IN# RE# ON# ING |

The Non-English feature of the parser can also be used with non-mathematical responses, e.g., as shown in FIG. 6B. In this case, steps s41-s45 are performed as above, however, in step s47', the feature does not check for mathematical symbols, does not consider ###, O ##, # O #, and ## O to be valid trigraph forms, and the "### OOO # OO # O ##### O" trigraphs do not appear in the list of legal trigraphs (indicated in Table I by a 0 in the left-most column). The feature then performs step s49 and one of steps s50 and s51, as above.

Figure 7:
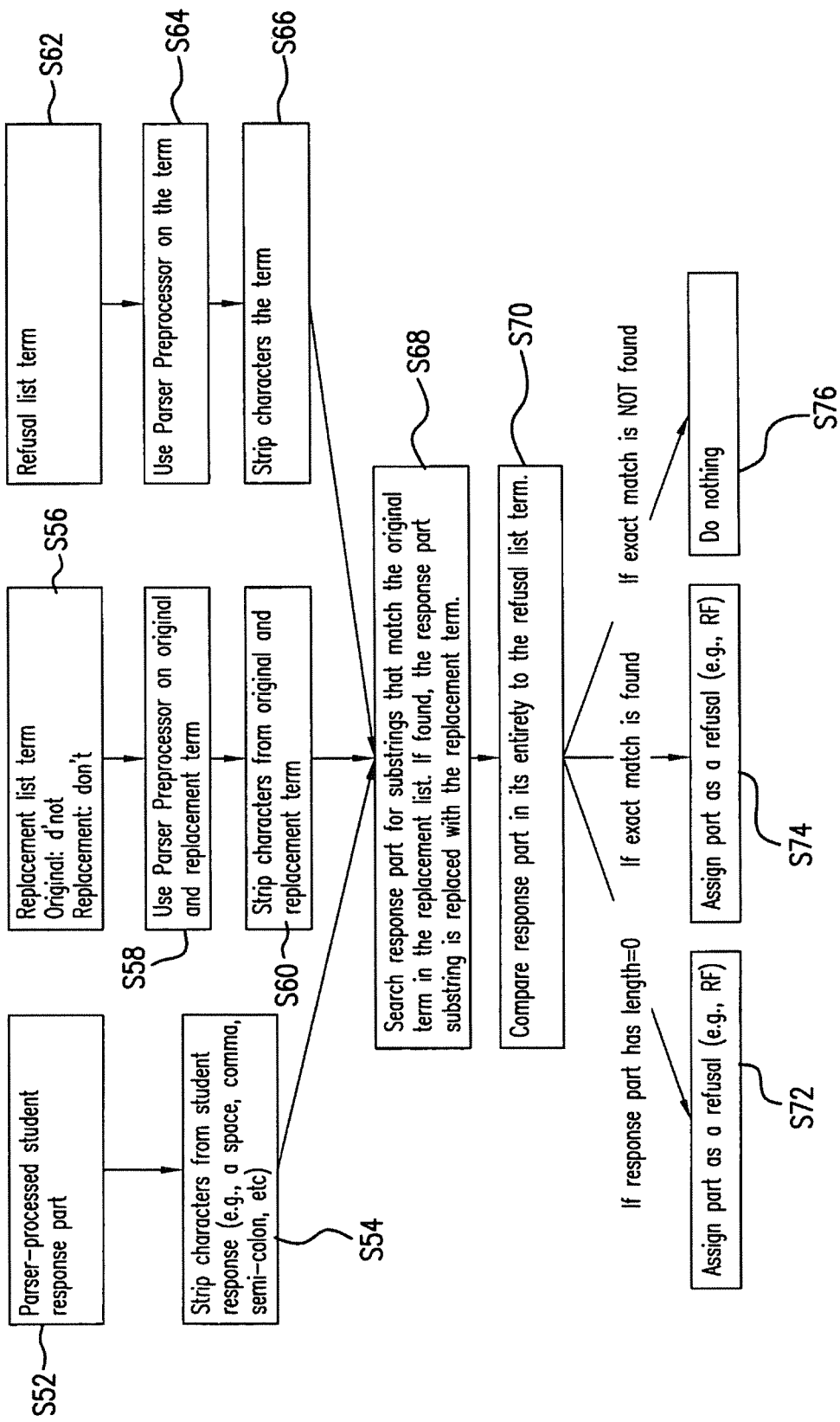
FIG. 7 is a flow diagram representing the process and/or data flow through a parser submodule designed to identify refusals according to an embodiment of the present invention.

FIG. 7 is a flow chart illustrating an embodiment of a method used by the parser to determine whether a student response is a refusal in accordance with the present invention. At step s52, the parser receives a pre-processed student response part, where by pre-processed is meant having undergone a replacement of carriage returns, line feeds, form feeds, horizontal tabs and the like with a space, stripping of extra space characters, removal of all spaces at the start and end of the response, and conversion of all characters to upper case. Preferably, the response part undergoes each of the foregoing pre-processing steps. The parser then strips characters, such as remaining spaces, commas, semi-colons, etc., from the response part at step s54. These stripped characters are specified by the user, though a default list of characters is supplied.

The parser reads in replacement terms (e.g., replace "DO NOT" with "DONT" as shown in Table II below), at step s56, and proceeds to pre-processes the original and replacement terms, at step s58. At step s60 characters such as spaces, commas, semi-colons, etc., are stripped from the original and replacement terms. In addition, the parser reads in a list of refusal terms, at step s62, pre-processes the refusal terms, at step s64, and strips characters, such as spaces, commas, semi-colons, etc., from the refusal terms, at step s66. In a preferred embodiment, the refusal strings do not contain any of the 'replaced' terms.

TABLE II

| RFReplaceList.txt (example) |
| --- |
| DONOT~DONT |
| DNOT~DONT |
| DOTN~DONT |
| IDONT~DONT |
| REALLYDONT~DONT |
| IHAVE~HAVE |
| IVE~HAVE |
| IAM~AM |
| IM~AM |
| idk~dont know |
| dk~dont know |
| dont now~dont know |

At step s68, the parser searches the pre-processed and stripped student response for substrings that match the original term in the replacement list and, if found, the response part substring is replaced with the replacement term. The parser then compares the response part in its entirety to the refusal list in step s70. Table III shows an example of a refusal list according to the present invention.

TABLE III

| refusalist.txt (example) |
| --- |
| dont know |
| have no clue |
| have absolutely no clue |
| dont know and dont care |
| no clue |
| no clue at all |
| not sure |

If an exact match is found, the parser assigns the part as a refusal at step s74. If the response part has a non-zero length but an exact match is not found, the parser does nothing at step s76. If, on the other hand, the response part has a length equal to zero, the parser assigns the response part as a refusal at step s72. This latter situation results when a response consists entirely of white space and stripped characters.

Figure 8:
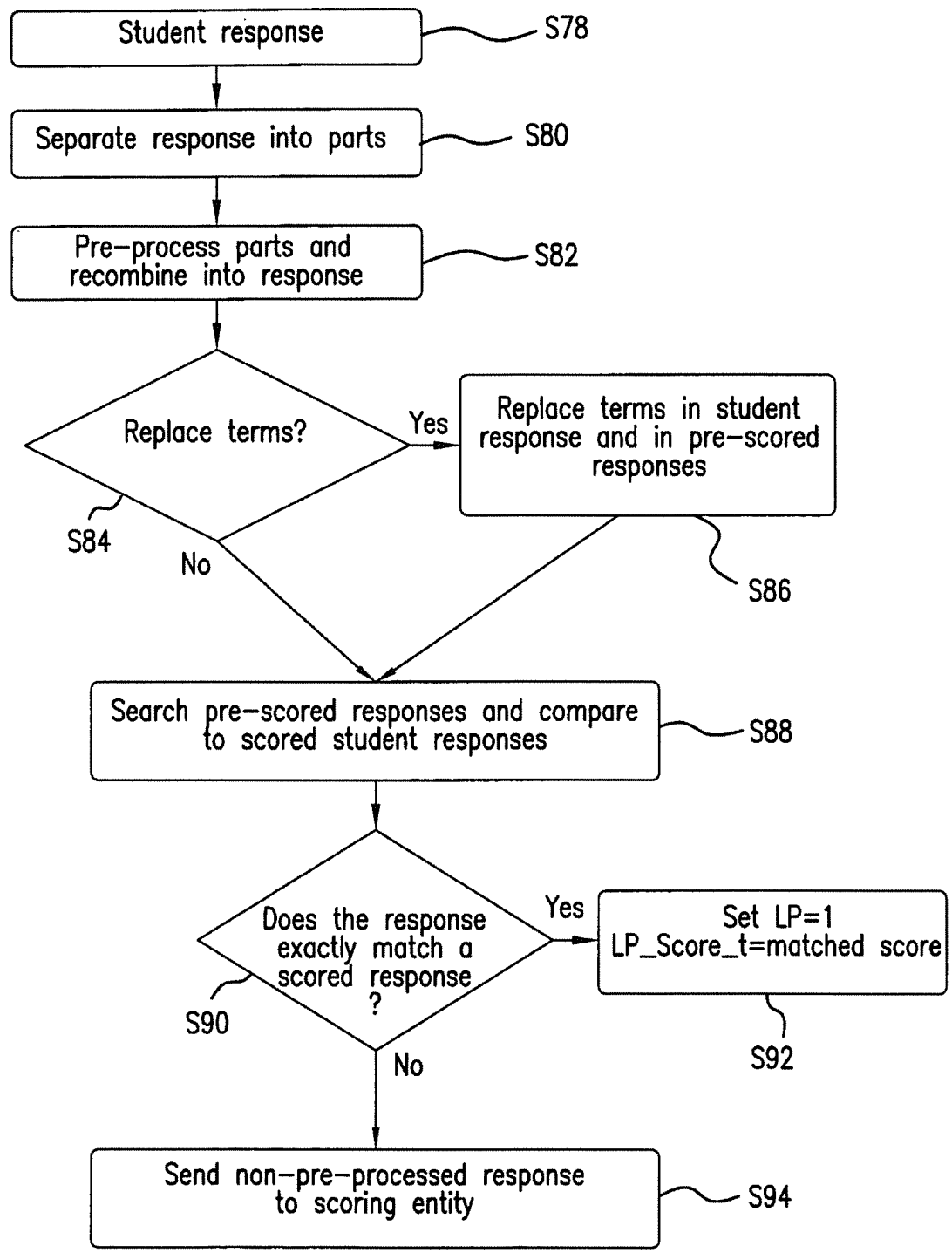
FIG. 8 is a flow diagram representing the process and/or data flow through a list-based processor module of an automated scoring system according to the present invention.

FIG. 8 is a flow chart illustrating details of the method used by the list-based processor to score constructed responses. In step s78, the list-based processor receives a student response from the parser. The list-based processor retrieves item characteristics from a database and separates the response into parts based on the item characteristics, at step s80. The list-based processor then pre-processes the response parts according to user specifications, at step s82, and recombines the pre-processed parts into a pre-processed student response. The pre-processing is similar to that used by the parser, but the user has more control of the character removal.

At step s84, a decision is made whether or not to replace terms in the student and pre-scored responses, in step s82. In a preferred embodiment, the determination is based on a user setting. If the answer is yes, the list-based processor reads a term replacement list from a database and replaces terms in the pre-processed student response and pre-scored responses with similarly pre-processed terms from the replacement list, at step s86. This replacement process is similar to that described for the refusal feature of the parser, except that the replacement process also allows terms to be deleted from a response. Table IV shows an example of a term replacement list according to the present invention. As an example, the response containing the term "15.00" is replaced with the term "15."

TABLE IV

TermReplaceList.txt (example)

15.00~15
15.50~15
DOLLAR~$
DALLAR~$
2m+6~6+2m
2m+6=c~c=2m+6

The pre-processed student response is then compared with pre-scored responses, at step s88, and a determination is made whether or not the pre-processed student response exactly matches one of the pre-scored responses, at step s90. If the pre-processed student response exactly matches a pre-scored response, the list-based processor assigns a score to the student response equal to the score assigned to the pre-scored response matching the student response, at step s92. The list-based processor preferably also sets a flag indicating that a score has been assigned. For example, the list-based processor may set a list-based processor flag (LP) to 1. If, on the other hand, the pre-processed score does not match any of the pre-scored responses, the list-based processor submits the non-pre-processed student response for scoring by another entity (e.g., hand-scoring or parser scoring), at step s94. In this case, the list-based processor preferably sets a flag indicating that a score has not been assigned. For example, the list-based processor may set LP to 0 to indicate that a score has not been assigned.

Figure 9:
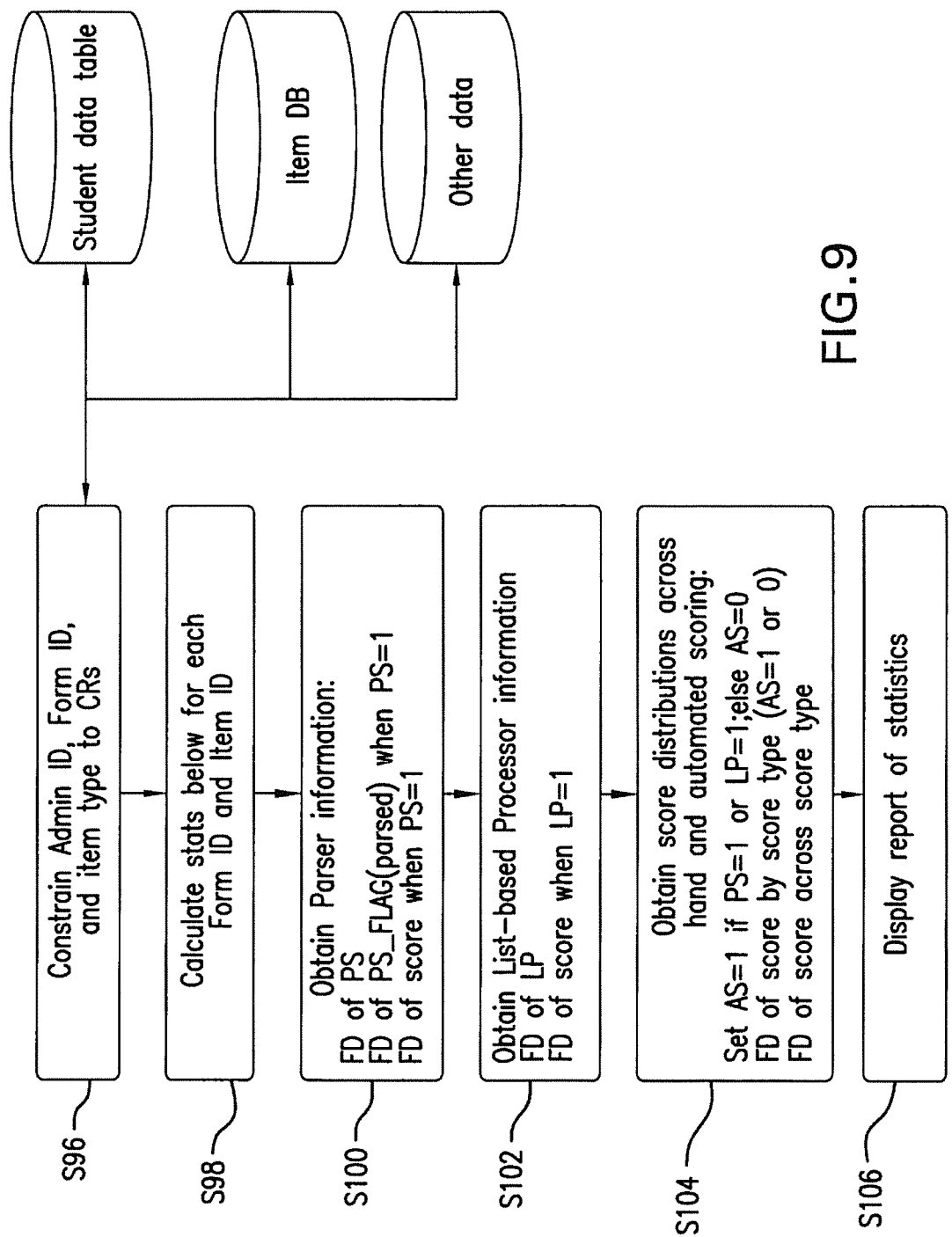
FIG. 9 is a flow diagram representing the process and/or data flow through a constructed response monitor module of an automated scoring system according to the present invention.

FIG. 9 is a flow chart illustrating a method of storing and reporting scored constructed response data from the automated scoring system according to the present invention. In step s96, the system receives a username and test form identifier from the user and retrieves constructed response data from one or more system databases based on the username and test form identifier. In an exemplary embodiment, the system retrieves item identifiers, student responses and scores constrained by administrator/user identity, test form and constructed response item type. The system may also retrieve flags indicative of whether or not a response was automatically scored by the parser or the list-based processor and other variables such as school, class and student identifiers. In step s98, the system calculates statistics for each test form and item. In an embodiment, the system does this by obtaining parser information, at step s100, and list-based processor information, at step s102, and calculates score distributions, at step s104. The system obtains parser information by calling a parser report subroutine that uses information, such as parser scores, item identifiers and other variables, to disaggregate the data. The system then computes a distribution of parser scores and creates a list of responses which were scored by the parser (e.g., with PS=1 and PS_FLAG). The system may then compute the same statistics with the disaggregation variables. List-based processor information may be obtained in a similar manner by calling a list-based processor report subroutine that retrieves data, generates disaggregation variables, and computes distributions of score (e.g., wen LP=1) based on the original and disaggregated data. To calculate overall score distributions, as set forth in step s104, the system preferably looks at the flags associated with each response to determine whether or not the parser or the list-based processor was able to automatically assign a score and set a flag (e.g., AS) indicating whether or not an automated score was assigned (e.g., by setting AS=1 if PS=1 or LP=1, or else setting AS=0). The system may then calculate a distribution of score by score type (e.g., AS=1 or 0), and a distribution of scores across score type.

The system may then display or print a report of the statistics, in step s106. The content and format of the report can be pre-programmed or user defined.

Figure 10:
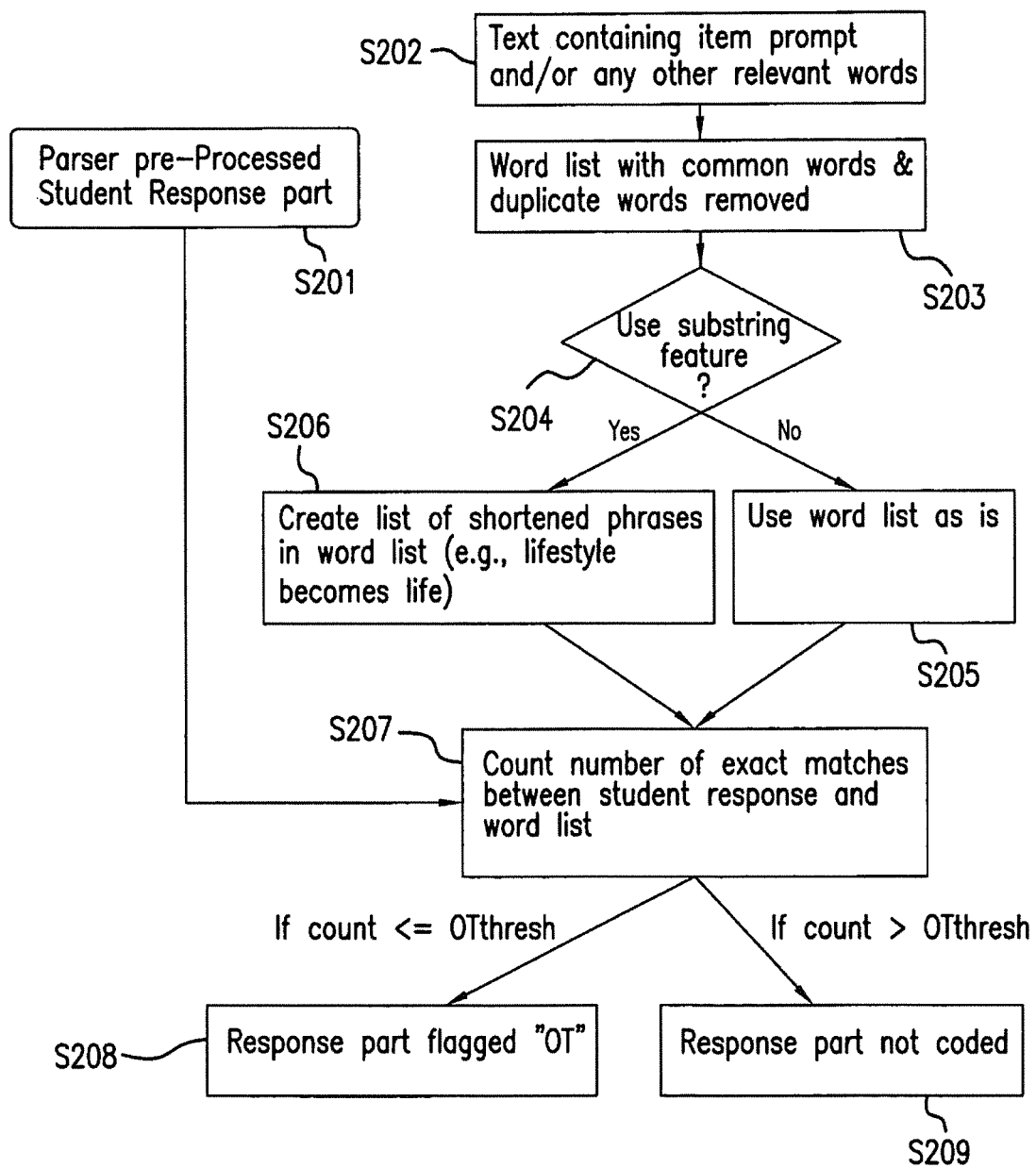
FIG. 10 is a flow diagram representing the process and/or data flow through a parser off-topic filter of an automated scoring system according to the present invention.

FIG. 10 is a flow chart illustrating details of a method that may be used by the parser to identify off-topic constructed responses in accordance with the present invention. The approach of the parser in identifying off-topic responses is to determine whether the response contains one or more on-topic words. In step s201, the parser receives a preprocessed student response. In step S202, the parser reads in a list of words considered on-topic for the item. For example, this file may contain words appearing in the item prompt, or expected words in the response. Common words, such as 'the' or 'a', and duplicate words are removed from this list, as outlined in step s203. At step S204 the parser determines whether the word list should be modified, based upon user specification. If "no," then the word list remains unchanged as in step s205. If "yes," then the word list is modified in step s206 as follows: words of a user-specified length are reduced by a user-specified percentage. As an example, all words of length greater than or equal to eight are reduced by 50%. In this example, the word "lifestyle" will be reduced to "life". Words of length less than a threshold are not modified. In step s207, the parser counts the number of words in the pre-processed student response that exactly match the number of words in the word list, ignoring duplicates. If this count does not exceed the user-specified threshold (e.g., OTThresh) then the parser assigns a code of "OT" to that part, in step s208. Otherwise, no code is assigned, at step s209.

Figure 11:
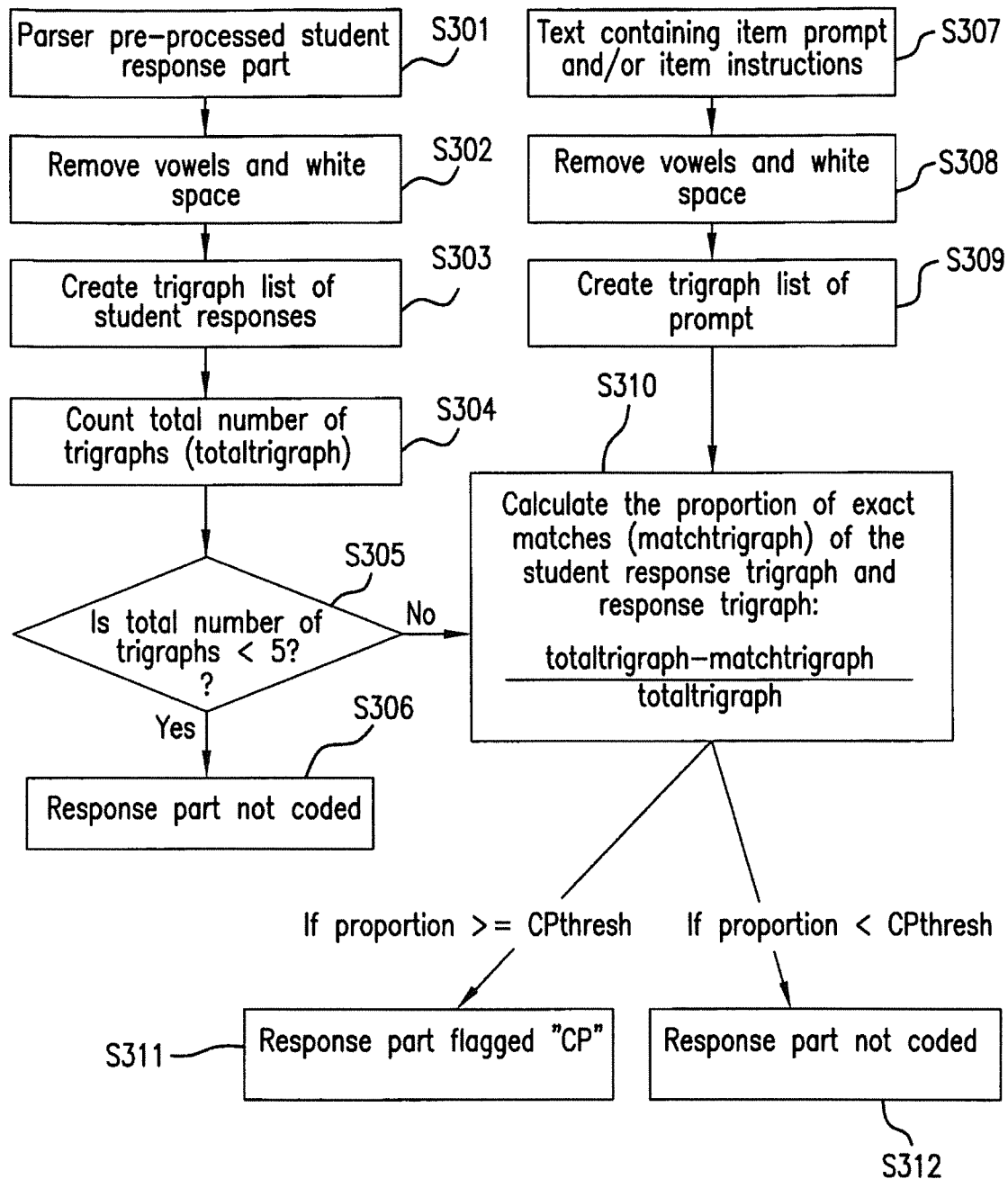
FIG. 11 is a flow diagram representing the process and/or data flow through a parser copy filter of an automated scoring system according to the present invention.

FIG. 11 is a flow chart illustrating details of a method that may be used by the parser to identify constructed responses which are copies of the item prompt or directions in accordance with the present invention. The approach of the parser in identifying copied responses is to use n-graphs (n-letter combinations, where n ranges from 1 to any positive integer) to determine whether the response is a copy of the prompt or directions. In step s301, the parser receives a preprocessed student response. In step s302, the parser removes white space and vowels from the response. In step s303, the parser creates a list of n-graphs of the student response and in step s304, counts the number of n-graphs. If the number of n-graphs is determined to be less than 5 in step s305, this feature of the parser terminates and no code is set for that response part (step s306). Otherwise, in step S307, the parser reads in a set of words presumably of the prompt or directions. Spaces and vowels are removed from the set of words, and a n-graph list is created, as listed in steps s308 and s309. In step s310, the number of exact matches between the student response n-graphs and prompt n-graphs is counted, and a proportion of non-matches is calculated. If the proportion is greater than the user-specified threshold (e.g., CPThresh), then the parser assigns the response part a code of "CP" (step s311). If the proportion is less than the user-specified threshold, then the parser does not assign a code (step s312).

From the above, it will be appreciated that the automated scoring system and method of the present invention can reduce the number of constructed responses submitted for hand-scoring, thereby lowering a major source of costs in a scoring program. In a preferred embodiment, the software attempts to score the responses. Responses that cannot be scored by the software are submitted for hand-scoring. The software can be tailored to individual items by setting parameters, and does not have to be trained with existing data.

The system and method includes two major parts referred to herein as a parser and a list-based processor. Users can opt to use one or both parts and can implement the parts in any order. In an embodiment, the parser has six features or functions, aside from pre-processing. The parser features can be implemented in any order. The system uses codes and flags as part of the method. For example, in an embodiment of the parser, the response is divided into parts (as determined by the item) and each part receives one code. The part codes are then combined into one response code. Each feature has a code associated with it that indicates whether that feature scored the response. If the code for a response is in the list of code combinations entered by the user, the parser scores the response. Otherwise, the Parser does not provide a score. The parser assigns responses only a score of 0. If the parser does not assign a score, then the original (un-pre-processed) response is sent to another scoring entity, such as the list-based processor or hand-scoring.

The list-based processor pre-processes responses, and compares the pre-processed responses to a pre-existing list of similarly pre-processed scored responses. The user can also opt to replace terms (such as misspellings) or remove terms in pre-processed response and pre-scored responses. If an exact match is found, then the list-based processor assigns the response the score of the matched scored response. If an exact match is not found, then the original (un pre-processed) response is sent to another scoring entity, such as the parser or the hand-scoring vendor.

The system and method can also optionally include a monitor that first queries the data for all records for the appropriate administration ID, Form ID, and for constructed response records only. The monitor then calculates statistics specific to the parser, and statistics specific to the list-based processor. Finally, it calculates the score frequency distribution overall, and for the automatically scored (and, optionally, hand-scored) responses.

The automated scoring system and method can be used by one or more users. In addition, different aspects of the system and method can be used by different users. For example, members of the information technology team can enter automated scoring parameters/lists from the research department, and members of the research department or the client can use the constructed response monitoring portion to calculate statistics, generate reports, etc.

The systems, processes, and components set forth in the present description may be implemented using one or more general purpose computers, microprocessors, or the like programmed according to the teachings of the present specification, as will be appreciated by those skilled in the relevant art(s). Appropriate software coding can readily be prepared by skilled programmers based on the teachings of the present disclosure, as will be apparent to those skilled in the relevant art(s). The present invention thus also includes a computer-based product which may be hosted on a storage medium and include instructions that can be used to program a computer to perform a process in accordance with the present invention. The storage medium can include, but is not limited to, any type of disk including a floppy disk, optical disk, CDROM, magneto-optical disk, ROMs, RAMs, EPROMs, EEPROMs, flash memory, magnetic or optical cards, or any type of media suitable for storing electronic instructions, either locally or remotely. The automated scoring system and method can be implemented on one or more computers. If more than one computer is used, the computers can be the same, or different from one another, but preferably each have at least one processor and at least one digital storage device capable of storing a set of machine readable instructions (i.e., computer software) executable by the at least one processor to perform the desired functions, where by "digital storage device" is meant any type of media or device for storing information in a digital format on a permanent or temporary basis such as, for example, a magnetic hard disk, flash memory, an optical disk, random access memory (RAM), etc.

The computer software stored on the computer ("software"), when executed by the computer's processor, causes the computer to retrieve constructed responses from a database or digital media. The software, when executed by the server's processor, also causes the server to process the constructed responses in the manner previously described.

The scoring system can be located at the testing facility or at a site remote from the testing facility. Communication between the scoring and testing computers can be accomplished via a direct connection or a network, such as a LAN, an intranet or the Internet.

The foregoing has described the principles, embodiments, and modes of operation of the present invention. However, the invention should not be construed as being limited to the particular embodiments described above, as they should be regarded as being illustrative and not as restrictive. It should be appreciated that variations may be made in those embodiments by those skilled in the art without departing from the scope of the present invention.

What is claimed is:

1. A system for improving scoring consistency for computer-scored constructed responses generated by one or more students in response to a prompt, said system comprising:
    a computer with a processor and a memory device storing a set of digital instructions executable by said processor, wherein the digital instructions comprise a parser module, a list-based module, and a manual scoring interface, wherein:
    the parser module executable by said processor to:
        receive a first plurality of constructed responses in an electronic font-based format from a database, determine, for each constructed response in said first plurality of constructed responses, whether the constructed response is blank, a refusal to respond, an off-topic phrase, or a copy of the prompt, assign one of a plurality of parser flags to each of said first plurality of constructed responses based on the determining, and store the assigned parser flag with a corresponding constructed response in the database;

the list-based module executable by said processor to:

receive a second plurality of constructed responses in the electronic font-based format from the database, match each of the constructed responses in said second plurality of constructed responses with one of a plurality of pre-scored constructed responses, assign, in the database, a score to each constructed response in said second plurality of constructed responses based on the matching, and assign, in the database, a list-based processor flag indicating that each of said constructed responses in said second plurality of constructed responses is scored; and a manual scoring interface executable by said processor to:

receive, over a communications network, a third plurality of constructed responses that have not been assigned a parser flag or a list-based processor flag for display on an interface, and upon determining that the third plurality of constructed responses have not been assigned the parser flag or the list-based processor flag, transmit, over the communications network to a hand-scoring system, the third plurality of constructed responses, wherein the hand-scoring system is associated with rubrics or anchor papers, and wherein the hand-scoring system is enabled to determine a set of manual scores corresponding to the third plurality of constructed responses.

2. The system of claim 1 wherein the parser module is further executable by said processor to:

strip spaces, commas, and semi-colons in the constructed response, search the constructed response for substrings that match a first term in a replacement term list, replace the searched substrings in the constructed response with the corresponding matching term in the replacement term list, and determine if the constructed response matches a second term in a refusal term list or has a length of zero.

3. The system of claim 1 wherein the parser module is further executable by said processor:

replace numeric, punctuation, and space symbols in the constructed response with a predetermined character of the constructed response, add the predetermined character to an end of the constructed response, divide the constructed response into one or more trigraphs, and determine whether each of the trigraphs are of one of a plurality of valid forms.

4. The system of claim 1 wherein the parser module is further executable by said processor to:

count a number of exact matches between the constructed response and a word list, and determine that the counted number is less than a predetermined threshold.

5. The system of claim 4 wherein the parser module is further executable by said processor to:

modify the word list based on a user specification, wherein the modifying comprises reducing words of a pre-specified length by a pre-specified percentage.

6. The system of claim 1 wherein the parser module is further executable by said processor to:

remove white space and vowels from the constructed response, generate a list of n-graphs of the constructed response, count a number of generated n-graphs of the constructed response, determine that the number of counted n-graphs of the constructed response is greater than a first predetermined threshold, remove white space and vowels from the prompt, generate a list of n-graphs of the prompt, count a number of matches between the generated constructed response n-graphs and the prompt n-graphs, count a number of non-matches between the generated constructed response n-graphs and the prompt n-graphs, and determine that a proportion of the counted matches exceeds a second predetermined threshold.

7. The system of claim 1, wherein the parser module is further executable by said processor to:

separate the constructed response into a plurality of parts based on one or more items characteristics, pre-process the plurality of parts according to a user specification, recombine the pre-processed plurality of parts into a pre-processed student response, and determine that the pre-processed student response matched one of the plurality of pre-scored constructed responses.

8. The system of claim 7, wherein the parser module is further executable by said processor to:

replace terms in the pre-processed student response with pre-processed terms from a replacement list.

9. The system of claim 1, wherein the digital instructions are executable by said processor to further:

generate a report of score distributions, and display the report of score distributions on a graphical user interface.

10. A computer-implemented method for improving scoring consistency for computer-scored constructed responses generated by one or more students in response to a prompt, the method comprising:

receiving a first plurality of constructed responses in an electronic font-based format from a database;

determining for each constructed response in said first plurality of constructed responses, whether the constructed response is blank, a refusal to respond, a non-English phrase, an off-topic phrase, or a copy of the prompt;

assigning one of a plurality of parser flags to each of said first plurality of constructed responses based on the determining;

storing the assigned parser flag with a corresponding constructed response in the database;

receiving a second plurality of constructed response in the electronic font-based format from the database;

matching each of the constructed responses in said second plurality of constructed responses with one of a plurality of pre-scored constructed responses;

assigning, in the database a score to each constructed response in said second plurality of constructed responses based on the matching;

assigning, in the database, a list-based processor flag indicating that each of said constructed responses in said second plurality of constructed responses in scored;

receiving, over a communications network, a third plurality of constructed responses that have not been assigned a parser flag or a list-based processor flag for display on an interface; and upon determining that the third plurality of constructed responses have not been assigned the parser flag or the list-based processor flag, transmitting, over the communications network to a hand-scoring system, the third plurality of constructed responses, wherein the hand-scoring system is associated with rubrics or anchor papers, and wherein the hand-scoring system is enabled to determine a set of manual scores corresponding to the third plurality of constructed responses.

11. The method of claim 10 wherein determining for each constructed response in said first plurality of constructed responses, whether the constructed response is the refusal to respond further comprises:

stripping spaces, commas, and semi-colons in the constructed response;

searching the constructed response for substrings that match a first term in a replacement term list;

replacing the searched substrings in the constructed response with the corresponding matching term in the replacement term list; and determining if the constructed response matches a second term in a refusal term list or has a length of zero.

12. The method of claim 10 wherein determining, for each constructed response in said first plurality of constructed responses, whether the constructed response is a non-English phrase further comprises:

replacing numeric, punctuations, and space symbols in the constructed response with a predetermined character;

adding the predetermined character to an end of the constructed response;

dividing the constructed response into one or more trigraphs; and determining whether each of the trigraphs are one of a plurality of valid forms.

13. The method of claim 10 wherein determining, for each constructed response in said first plurality of constructed responses, whether the constructed response is the off-topic phrase further comprises:

counting a number of exact matches between the constructed response and a word list; and determining that the counted number is less than a predetermined threshold.

14. The method of claim 13, further comprising:

modifying the word list based on a user specification, wherein said modifying comprises reducing words of a pre-specified length by a pre-specified percentage.

15. The method of claim 10 wherein determining, for each constructed response is said first plurality of constructed responses, whether the constructed response is the copy of the prompt further comprises:

removing white space and vowels from the constructed response;

generating a list of n-graphs of the constructed response;

counting a number of generated n-graphs of the constructed response;

determining that the number of counted n-graphs of the constructed response is greater than a first predetermined threshold;

removing white space and vowels from the prompt;

generating a list of n-graphs of the prompt;

counting a number of matches between the generated constructed response n-graphs and the prompt n-graphs; and determining that a proportion of the counted matches exceeds a second predetermined threshold.

16. The method of claim 10, wherein matching each of the constructed responses in said second plurality of constructed responses with one of a plurality of pre-scored constructed responses further comprises:

separating the constructed response into a plurality of parts based on one or more item characteristics;

pre-processing the plurality of parts according to a user specification;

recombining the pre-processed plurality of parts into a pre-processed student response; and determining that the pre-processed student responses matches one of the plurality of pre-scored constructed responses.

17. The method of claim 16, further comprising:

replacing terms in the pre-processed student response with pre-processed terms from a replacement list.

18. The method of claim 10, further comprising:

generating a report of score distributions.

19. A computer-program product for improving scoring consistency for computer-scored constructed responses generated by one or more students in response to a prompt comprising computer program code, when run on a computer coupled to a processor and a non-transitory memory, causes the processor to perform the steps of:

receiving a first plurality of constructed responses in an electronic font-based format from a database;

determining, for each constructed response in said first plurality of constructed responses, whether the constructed response is: blank, a refusal to respond, a non-English phrase, an off-topic phrase, or a copy of the prompt;

assigning one of a plurality of parser flags to each of said first plurality of constructed responses based on the determining;

storing the assigned parser flag with a corresponding constructed response in the database;

receiving a second plurality of constructed responses in the electronic font-based format from the database;

matching each of the constructed responses in said second plurality of constructed responses with one of a plurality of pre-scored constructed responses;

assigning, in the database, a core to each constructed response in said second plurality of constructed responses based on the matching;

assigning, in the database, a list-based processor flag indicating that each of said constructed responses in said second plurality of constructed responses is scored;

receiving, over a communications network, a third plurality of constructed responses that have not been assigned a parser flag or a list-based processor flag for display on an interface; and upon determining that the third plurality of constructed responses have not been assigned the parser flag or the list-based processor flag, transmitting, over the communications network to a hand-scoring system, the third plurality of constructed responses, wherein the hand-scoring system is associated with rubrics or anchor papers, and wherein the hand-scoring system is enabled to determine a set of manual scores corresponding to the third plurality of constructed responses.

20. The computer-program product of claim 19, wherein said step of matching each of the constructed responses in said second plurality of constructed responses with one of a plurality of pre-scored constructed responses further comprises:

- separating the constructed response into a plurality of parts based on one or more item characteristics;
- pre-processing the plurality of parts according to a user specification;
- recombining the pre-processed plurality of parts into a pre-processed student response; and
- determining that the pre-processed student response matches one of the plurality of pre-scored constructed responses.

\* \* \* \* \*